3,641,016
THIONINE DERIVATIVES
Jeno Korosi and Gyorgy Csaba, Budapest, Hungary, assignors to Egyesult Gyogyszer es Tapszergyar, Budapest, Hungary
No Drawing. Filed Feb. 3, 1969, Ser. No. 796,216
Claims priority, application Hungary, Feb. 16, 1968, EE-1,491
Int. Cl. C07d 93/12
U.S. Cl. 260—243  1 Claim

ABSTRACT OF THE DISCLOSURE

New compounds having the formula

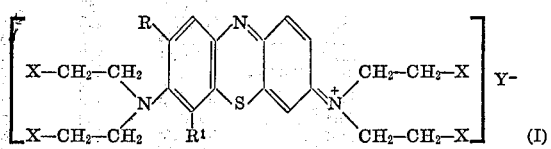

wherein R is H, Cl or methoxy, $R^1$ is H or Cl, X is Cl, and Y is Cl, perchlorate, $HSO_4$, tartrate or Br. The compounds show a better inhibitory activity on mice and rats against the transplantable Ehrlich ascites tumor, the $C_3H$-tumor, the Yoshida-tumor, the Benevolenskaja-tumor and the Guerin-tumor than the known cytostatica.

---

This invention relates to novel thionine derivatives.

The compounds show a better inhibitory activity on mice and rats against the transplantable Ehrlich ascites tumor, the $C_3H$-tumor, the Yoshida-tumor, the Benevolenskja-tumor and the Guerin-tumor than the known cytostatica.

A special group of compounds having tumour-inhibitory activity has been developed by connecting cytostatic and antimetabolic compounds to inactivated heparine, that does not inhibit thrombokinesis (Hung. Pat. No. 149,746, Neoplasma 11, 137, 345 (1964)). The applicability of these compounds has been based on the experience, that the amount of heparine accumulated in the metabolism decreases under tumoural conditions, while heparine-containing Ehrlich cells are accumulated in the environment of tumours and proliferating tissues. Accordingly, tumoural cells need also heparine for their proliferation.

It has also been observed, that transplantable experimental tumours grow more rapidly when heparine-constitutents (glucuronic acid, glucamine) are administered (Brit. J. Cancer 14, 362 (1960)), while their growth can be sufficiently selectively retarded by the chemical fixing of heparine in vitro and in vivo conditions with toluidine blue or protamine sulfate (Brit. J. Cancer 14, 367 (1960)).

The present invention is based on the presumption, that heparine-fixing substances are accumulated at the same place as heparine, that is, in the tumours, or in their environment. Accordingly, if a heparine-fixing substance—i.e., a compound containing a quaternary nitrogen atom in quinoidal structure, e.g. thionine, methylene blue, toluidine blue or alkyline proteins—is completed by a cytostatic moiety, far greater amounts of the cytostatic compound are to be present in the tumours and in their environment, than in any other part of the metabolism. As even the fixing of heparine inhibits the mitosis of tumoural cells, effective cytostatic compounds having two points of attack can presumably be prepared by introducing cytostatic moieties into heparine-fixing materials.

The antitumoural compounds according to the present invention are characterized by the formula

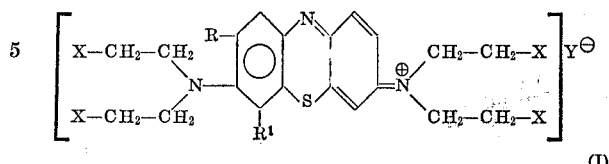

wherein X is Cl, Y is Cl, perchlorate, $HSO_4$, tartrate or Br, R is H, Cl or methoxy and $R^1$ is H or Cl.

The novel compounds of the Formula I can be prepared, according to the present invention, by oxidizing a phenylene-diamine derivative of the formula

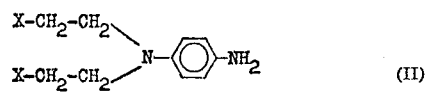

wherein X has the meanings as stated above—or a mixture of compounds having the Formula II and dihydroxyethyl—or N-dihaloethylaniline in the presence of a compound capable of sulfur-transmission under acidic conditions.

The oxidation can be carried out with ferric chloride in the presence of hydrogen sulfide (DBP. Nos. 1,886 and 24,125). The mixture of a compound having the Formula II and the aniline-derivative can be oxidized preferably with bichromates in the presence of aluminium thiosulfate or nascent thiosulfuric acid, liberated from sodium thiosulfate under the reaction conditions. The reaction can be successfully carried out also in the presence of zinc chloride.

The sulfo group is eliminated as sulfuric acid or sulfurous acid, which can be converted into dithionate by treating with manganese dioxide or cupric sulfate (Annalen 230, p. 73 (1885), 251 p. 1 (1889), Fierz-David: Farbenchemie, 2nd edition, p. 186 (1922)).

According to the most preferable process for preparation of the compounds of the invention a phenothiazine compound of the formula

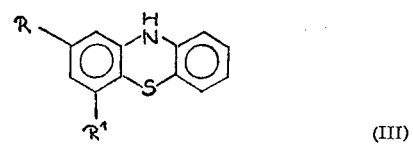

wherein R and $R^1$ have the meanings as stated above—is oxidized in the presence of a secondary amine having the formula

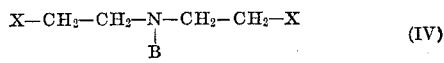

wherein X has the meaning as stated above, and B represents a hydrogen or halogen atom. The oxidation process is carried out according to conventional methods.

According to another advantageous method, a phenothiazine compound of the Formula III is reacted with a halogen to yield the corresponding dihalo derivative (Ber. 48, p. 318 (1915), 49, p. 53 (1916)), which preferably without any isolation step, is later oxidized with an additional amount of a halogen in the presence of a secondary amine having the Formula IV. The reaction is preferably carried out in inert organic solvents, e.g. in dioxane, or in a mixture of dioxane and methanol.

According to another method the compounds of the Formula III are reacted with halo-derivatives having the Formula IV at a temperature of about 0° C. In some cases the compounds of the Formula I, wherein Y represents chlorine, are formed, directly.

The compounds having the Formula I can be prepared further by treating a compound of the formula

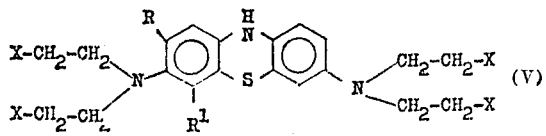

wherein X, R and R¹ have the meanings as stated above—with an oxidizing agent under acidic conditions. As oxidizing agent there can be used preferably a halogen, hydrogen peroxide chromic acid or lead dioxide.

The compounds of the Formula I, wherein X represents a hydroxy group, can be converted into the corresponding halo-derivatives, wherein X represents a halogen atom, by reacting with halogenating agents. If the halogenating agent is thionyl chloride the compounds may suffer reduction during this procedure, however the formed compounds of the Formula V can be readily re-oxidized to the desired compounds having the Formula I.

The compounds of the Formula I can be further converted into any other compound of the Formula I by conventional techniques. Thus, for instance, the Y—if an acid residue—can be replaced by another acid residue by reacting the compound of the Formula I with a stronger acid than that corresponding to the radical Y (e.g. the chloride group can be replaced by perchlorate radical). Alternatively, the thionine derivative of the Formula I can be converted into the free bases by reacting them with alkali metal hydroxides or carbonates, and the thus-obtained substances are reacted with the desired organic or inorganic acids. Moreover, a thionine derivative of the Formula I can be reacted with the alkali metal, alkaline earth metal, earth metal or ammonium salt of any acid weaker than the acid corresponding to the group Y to give any other desired thionine derivative of the Formula I.

It is worthwhile to note that the substances of the Formula I, where X represents a hydroxy group, are—as expected—excellently water soluble; accordingly it is rather complicated to prepare the pure compounds. The good adsorption on active carbon is shown by the decolourizing ability of the dark blue solution when treating it with about 2 fold of weight of active carbon. The salts and solvents can be eluated from the thus-obtained granular, well filterable absorbate by washing it with water. The thionine derivatives of the Formula I, wherein X represents a chlorine or bromine atom, are less soluble. Their solubility in water is about 0.4 to 1 g./100 ml., in ethanol it is about 0.3 to 1.5 g./100 ml., in dimethylsulfoxide or dimethylformamide it is about 15 to 30 g./100 ml., depending on the anion Y.

The compounds of the Formula I can be transformed into pharmaceutical compositions, by adding the customary carriers and auxiliary materials.

The specific coupling of the novel compounds to heparine or heparine containing Ehrlich cells, respectively, has been investigated on membrane preparates obtained from subcutaneous interstitial tissues of rats, having been previously coloured with the novel compounds. The grains of the Ehrlich cells were dyed in a totally selective ortochromatic manner, while other cells or cellular elements did not show an affinity to the dyestuff.

The tumor-inhibitory activity of some of the novel compounds has been compared on Ehrlich ascites tumor. Groups of male albino mice, each consisting of 7 animals, have been infected intraperitoneally with a dosis of $2.5 \times 10^6$ cells. The compounds to be tested have been introduced in 100 mg./kg. doses per day, the treatment started 24 hours after the inefection. The compounds to be tested have been dissolved in dimethylformamide, and the solution has been diluted with water before administering to the animals. The treatment has been continued for 14 days. Ascites weighing, counting of cells and weighing of spleen has been carried out on the 15th day. The results are listed in the following table.

| Compound of the Formula I | Average number of cells | Weight of the spleen, mg. | Grade of inhibition, percent |
| --- | --- | --- | --- |
| Control group (untreated) | $2192 \times 10^6$ | 87 | |
| R=R¹=H, X=Cl, Y=Cl | $629 \times 10^6$ | 105 | 68.5 |
| R=R¹=H, X=Cl, Y=ClO₄ | $651 \times 10^6$ | 96 | 67.3 |
| R=R¹=H, X=Cl, Y=HSO₄ | $727 \times 10^6$ | 160 | 66.6 |
| R=R¹=H, X=Cl, Y=acidic tartrate | $509 \times 10^6$ | 125 | 76.7 |
| R=R¹=H, X=Cl, Y=Br | $511 \times 10^6$ | 103 | 76.7 |
| R=H, R¹=Cl, X=Cl, Y=Br | $581 \times 10^6$ | 118 | 73.4 |
| R=H, R¹=Cl, X=Cl, Y=Cl | $608 \times 10^6$ | 92 | 72.4 |
| R=Cl, R¹=H, X=Cl, Y=Br | $747 \times 10^6$ | 111 | 65.8 |
| R=Cl, R¹=H, X=Cl, Y=Cl | $409 \times 10^6$ | 99 | 81.4 |
| R=CH₃O, R¹=H, X=Cl, Y=Br | $752 \times 10^6$ | 148 | 65.8 |
| R=CH₃O, R¹=H, X=Cl, Y=Cl | Every animal dies within 72 hrs. | | |

Every tested compound inhibits the growth of tumors in a great extent, which is proved by the increase of the weight of spleen related to those of the control-animals. They exert no toxic side-effects, with the exception of the last compound, which proved to be toxic.

With respect to the toxicity values and other points of view, the thionine derivative having the Formula I, wherein R and R¹ represent hydrogen, X and Y represent chlorine, seems to be first of all suitable for clinical experiments.

This compound has been tested on animals infected with transplantable tumors. The results are listed in the following tables.

It is to be mentioned that the above new compound shows a considerable inhibitory effect against the C₃H tumor of mice. Spontaneously proliferated C₃H mammal tumor has been injected into female C₃H mice, and doses of 150 mg./kg. per day of the compound have been injected intramuscularly in the form of a dimethylsulfoxide solution for a period of 26 days, starting 24 hours after infection. 15 days after treatment the tumors of the control animals weighed 4.2 g. in average, while the treated animals had an average tumor-weight of 0.82 g. The grade of inhibition is 80.5 percent.

The results of the tests indicate, that most of the novel compounds having the Formula I possess specific and very intensive tumor-inhibitory activity of a wide spectrum, practically without any toxic side-effects. The predominant effect of the novel compounds is their heparine-fixing activity, and the presence of cytostatic groups increases their effectiveness. The compounds can be administered orally as well, without any loss in the effect.

EXAMINATION OF ASCITES TUMORS ON MICE

| No. of animals, control/treated | Kind of tumor | Duration and method of treatment | Doses, mg./kg. | No. of cells pro animals, control/treated | Grade of inhibition, percent | Tumor-free | Alteration, percent Spleen weight | Body weight |
| --- | --- | --- | --- | --- | --- | --- | --- | --- |
| 5/5 | Ehrich | 9 days, i.m | 60 | $1090/400 \times 10^6$ | 63.0 | 0/5 | | |
| 5/10 | do | 7 days, i.m | 60 | $504/144 \times 10^6$ | 71.5 | 4/10 | +44 | +20 |
| 9/7 | do | 10 days, i.m | 80 | $550/0 \times 10^6$ | 100.0 | 7/7 | +59 | ±0 |
| 9/5 | do | 3, 6, 9, days, i.m | 240 | $550/0 \times 10^6$ | 100.0 | 5/5 | ±0 | ±0 |
| 9/5 | do | 1 day, i.m | 240 | $550/18 \times 10^6$ | 67.8 | 2/5 | +3.5 | ±0 |
| 9/9 | J.B.K | 10 days, i.m | 80 | $349/123 \times 10^6$ | 77.5 | 2/6 | +29 | ±0 |
| 9/6 | do | 3, 6, 9 days, i.m | 240 | $349/80 \times 10^6$ | 77.5 | 2/6 | +27 | ±0 |
| 9/8 | do | 1 day, i.m | 240 | $349/237 \times 10^6$ | 32.0 | 0/8 | +4.2 | ±0 |
| 8/8 | NK/Ly | 14 days, i.m | 60 | $820/308 \times 10^6$ | 62.5 | 2/8 | −43 | −11 |

There were no tumor-free animals in the control group. 49% of the treated animals were free of tumors, including even those, which had received only one injection. The administered dosage is practically non-toxic.

The product dissolves immediately forming a dark blue solution, the evolved $SO_2$ and HBr keep the mixture in gentle bubbling. The temperature of the mixture rises to about 35° C. Thereafter the reaction mixture is refluxed

EXAMINATION OF SOLID TUMORS ON RATS

| No. of animals, control/ treated | Kind of tumor | Duration and method of treatment | Doses, mg./kg. | Weight of tumors, control/ treated | Grade of inhibition, percent | Tumor-free | Alteration, percent Spleen weight | Body weight |
|---|---|---|---|---|---|---|---|---|
| 6/10 | Yoshida | 7 days from 4th day after infection, i.m. | 60 | 11.5/0 | 100.0 | 10/10 | | |
| 8/9 | Benevolenskaja | 10 days from 7th day after infection, i.m. | 60 | 23.0/12.6 | 45.0 | 0/9 | +12.5 | −10 |
| 8/14 | do | do | 100 | 23.0/9.4 | 59.0 | 3/14 | +8.0 | +3.1 |
| 10/16 | Guerin | 22 days from 2nd day after infection, i.m. | 60 | 23.0/9.3 | 60.5 | 10/16 | +7.2 | +7.0 |

There were no tumor-free animals in the control group. 47% of the treated animals were free of tumors, in the case of Yoshida-tumor total inhibition has been achieved. Among the tumor-free animals there have appeared tumors only in the case of one animal, 2 months after the treatment, the others remained tumor-free. The compound is non-toxic in the administered dosage.

The present invention is further elucidated by the aid of the examples. The examples are given for illustration and by way of limitation.

EXAMPLE 1

39.8 g. (0.2 mole) of phenothiazine are dissolved in 200 ml. of dioxane. 147 g. (1.4 moles) of diethanolamine dissolved in 600 ml. of methanol are added to the solution, and 31 ml. (0.6 mole) of bromine are added dropwise to the thus-obtained mixture with stirring and cooling in ice. The dark blue reaction mixture is poured into 1.7 l. of water, the solid by-product (about 10 to 15 g.) is filtered off, washed with 300 ml. of water, and the filtrate and washings are evaporated under reduced pressure. The residue contains a great amount of diethanolamine hydrobromide impurity. The residue is dissolved in 100 ml. of 85% aqueous acetic acid solution of 50 to 60° C., 100 ml. of tetrahydrofurane are added to the solution, and the mixture is kept in refrigerator for some days. The separated greenish, shinning needles are filtered off and washed with a 2:1 mixture of glacial acetic acid and tetrahydrofurane. 21 g. of N,N,N',N'-tetra-(β-hydroxyethyl)-thionine bromide are obtained. The compound is well soluble in water forming a blue solution. The crude substance is purified by recrystallization from glacial acetic acid, or by precipitating the substance from glacial acetic acid solution with equal volume of dioxane.

Analysis.—$C_{20}H_{26}BrN_3O_4S$: Calculated (percent): C, 49.59; H, 5.41; N, 8.68; S, 6.62; Br, 16.50. Found (percent): C, 49.44; H, 5.74; N, 8.88; S, 6.48; Br, 16.33.

EXAMPLE 2

The starting materials are the same as used in Example 1, but the dioxane-methanol solvent mixture is replaced by 500 ml. of dioxane. After adding bromine, the formed phenothiazonium bromide separates from the dark greenish dioxane phase as thick, dark blue oil. The dioxane phase is decanted and 1.7 l. of water are added to the oil and water-insoluble by-products are removed by filtration. Active carbon is added to the reaction mixture until the solution becomes colourless or pale greenish. The adsorbate is filtered, the solvent and diethanolamine hydrobromide are removed by washing with large amounts of water, and the granular adsorbate is dried in air or in exsiccator below a temperature of 35° C. 92 g. of adsorbate are obtained, which consists of 62 g. of active carbon and 30 g. of N,N,N',N'-tetra-(β-hydroxy-ethyl)-thionine bromide. Accordingly, the substance can be separated quantitatively from its aqueous solution by treating with about 2 fold quantity of active carbon.

EXAMPLE 3

12 g. of N,N,N',N' - tetra-(β-hydroxy-ethyl)-thionine bromide (prepared according to Example 1) is added portionwise, during 15 minutes to 50 ml. of thionyl bromide. by 50° C. for 3 hours. During this procedure red crystals begin to separate. The end-product is partly reduced to the leuko-derivative by $SO_2$ which remains however in the solution. The mixture is cooled, the product is collected by filtration, washed with 2× 20 ml. of anhydrous benzene and dried in vacuum exsiccator filled with potassium hydroxide. The product is powdered several times while drying. 11.9 g. of N,N,N',N'-tetra-(β-bromo-ethyl)-thionine bromide are obtained (btto. Formula=$C_{20}H_{22}Br_5N_3S$)

The product is hardly soluble in water.

EXAMPLE 4

By using the same method as stated in Example 3 except that thionyl bromide is replaced by thionyl chloride. The hydroxy group in the position 4 is replaced by chlorine but due to the presence of the evolved hydrogen chloride, most of the bromide anions are also replaced by chloride. Starting from 11.9 g. of N,N,N',N'-tetra-(β-hydroxyethyl)-thionine bromide, 9 g. of bronze red, shining needles are obtained. Pure N,N,N',N'-tetra-(β-chloro-ethyl)-thionine chloride can be prepared by dissolving the bromide in 35 ml. of glacial acetic acid and introducing anhydrous gaseous hydrogen chloride into the solution for 1 hour under cooling in water bath. The thus-obtained solution is evaporated under reduced pressure to the two-third of its orginal volume, and the product is precipitated with 120 ml. of toluene. Yield: 8.3 g.

Analysis.—$C_{20}H_{22}Cl_5N_3S$: Calculated (percent): N, 8.18; S, 6.24; Cl, 34.51. Found (percent): N, 8.10; S, 6.75; Cl, 34.96.

EXAMPLE 5

1.81 g. (0.01 mole) of N,N-bis(β-hydroxy-ethyl)-aniline are dissolved in 20 ml. of concentrated hydrochloric acid, and a solution of 0.7 g. of sodium nitrite in 2 ml. of water is added dropwise to the stirred mixture at −5° C. The mixture is allowed to stand for half an hour, then 4 g. of powdered zinc are added to the mixture under cooling, for reducing the nitroso compound. The mixture is filtered, and the filtrate is diluted with water to 100 ml. volume. 1.2 g. (0.005 mole) of $Na_2S.9H_2O$ are dissolved in 50 ml. of water, the above filtrate is added to hte solution, followed immediately by 300 ml. of a 2% aqueous ferric chloride solution. The formed blue solution is treated with active carbon as described in Example 2. 4.2 g. of adsorbate containing N,N,N',N'-tetra-(β-hydroxy-ehtyl)-thionine chloride are obtained, from which 1.2 g. of the desired product can be isolated.

EXAMPLE 6

By using the same method as described in Example 5 except that N,N-bis-(β-hydroxy-ethyl)-aniline is replaced by 2.18 g. (0.01 mole) of N,N-bis-(β-chloro-ethyl)-aniline. 5 g. of adsorbate containing N,N,N',N'-tetra-(β-chloro-ethyl)-thionine chloride are obtained from which 1.45 g. of the desired product can be isolated.

EXAMPLE 7

19.9 g. (0.1 mole) of phenothiazine are dissolved in 100 ml. of dioxane, 500 ml. of methanol and 99.4 g. (0.7 mole) of bis-(β-chloro-ethyl)-amine are added, and, during 15 minutes, about 10 l. of gaseous chlorine are introduced under vigorous stirring and cooling in ice. A dark blue solution is obtained. The mixture is poured immediately into 4 l. of 10% aqueous sodium chloride solution. Bronze red, shining precipitate separates, and the solution becomes light greenish blue.

The mixture is allowed to stand for half an hour, the liquid phase is decanted, and the residue is triturated with 2× 100 ml. of water. The product solidifies within some hours of drying, 30 g. of N,N,N',N'-tetra-($\beta$-chloro-ethyl)-thionine chloride are obtained. The crude substance can be purified by recrystallization, precipitation, or by converting it e.g. into the perchlorate salt, and eliberating the base. The solubility of the substance is 0.5 g./100 ml. in water, 0.35 g./100 ml. in ethanol and 25 g./100 ml. in dimethylsulfoxide or dimethylformamide. Its ultraviolet absorption spectrum shows a maximum at 645 m$\mu$, which is characteristic of methylene blue and related compounds (600 to 660 m$\mu$).

In the above procedure bis-(chloro-ethyl)-amine can be replaced by equivalent amount of its hydrochloride salt, but in this case 28 g. (0.7 mole) of sodium hydroxide dissolved in 40 ml. of water is added to the solution. The formation of the free base is accompanied by the precipitation of large amounts of sodium chloride.

EXAMPLE 8

According to the method of Bernthsen and Ulrich (Fierz-David: Farbenchemie, 2nd edition 1922), but replacing dimethylaniline by equivalent amount of N,N-bis-(beta-chloro-ethyl)-aniline, N,N,N',N' - tetra-(beta-chloro-ethyl)-thionine chloride can be obtained with a yield of 25%. The thus-obtained crude product contains a great amount of impurities. The crude substance can be purified by salt formation with zinc chloride, and by the removal of the zinc compound with sodium carbonate, as described in the cited literature.

EXAMPLE 9

The active carbon adsorbates containing the tetrahydroxy compounds of the Formula I prepared by any method, e.g. according to Examples 2 and 5, can be converted into pure tetrachloro derivatives by adding the adsorbate to a large excess of thionyl chloride, whereupon the tetrachloro-compound is eluated with thionyl chloride during the reaction. The reaction is carried out e.g. as follows:

3 g. of adsorbate containing 0.9 g. of tetrahydroxy compound are added to 10 ml. of thionyl chloride under cooling, then the mixture is heated gradually to 70° C. within one hour. The mixture is allowed to cool to 35–40° C., the separated carbon is filtered off with slight suction at a G4 sintered glass filter and washed with 3× 2 ml. of 40° C. thionyl chloride. The bulk of thionyl chloride is distilled off under vacuum from the dark blue solution, 5 ml. of anhydrous benzene are added to the residue, and the mixture is evaporated to dryness. The crude tetrachloro derivative of the Formula I is obtained with almost quantitative yield. The traces of thionyl chloride are removed preferably by keeping the substance in a vacuum exsiccator filled with alkali.

EXAMPLE 10

The process described in Example 9 is repeated, but instead of evaporating the dark blue thionyl chloride solution, it is poured on crushed ice. The $SO_2$, forming at the decomposition of thionyl chloride, reduces the thionine derivative to a green coloured phenothiazine derivative of the Formula V, which is insoluble even in aqueous hydrochloric acid. The elementary analysis of the product corresponds to the btto. Formula $C_{20}H_{23}Cl_4S$. The thus obtained phenothiazine compound having the Formula V can be re-oxidized into the corresponding thionine derivative of the Formula I, by reacting it with an equivalent amount of manganese dioxide, lead dioxide, bichromates or persulfates in dilute mineral acidic medium. Moreover, the leuko compound can be oxidized with chlorine or bromine in e.g. a dioxane solution, or by bubbling air through a dioxane solution, in the presence of an acid.

EXAMPLE 11

The perchlorate salts having the Formula I can be prepared with the highest purity, therefore the crude substances obtained by the methods described in e.g. Examples 3, 4, 6, 7, 8, 9 and 10, can be purified preferably through their perchlorate salts.

2.5 g. of N,N,N',N'-tetra-($\beta$-chloro-ethyl)-thionine chloride or bromide are dissolved in a mixture of 30 ml. of absolute ethanol and 10 ml. of dioxane at 50 to 60° C., and 0.45 ml. of 75% aqueous perchloric acid solution are added to the stirred and cooled mixture. A crystalline substance separates immediately. The mixture is kept in refrigerator, the crystals are collected by filtration and washed with 3× 2 ml. of absolute ethanol. 1.4 to 2.5 g. of shining, greenish-brown crystals are obtained, the yield depends on the purity grade of the starting halo-compound. The elementary analysis corresponds to the btto. formula of $C_{20}H_{22}Cl_5N_3O_4S$.

EXAMPLE 12

2.5 g. of pure N,N,N',N'-tetra-($\beta$-bromo-ethyl)-thionine chloride or bromide are dissolved in the mixture of 30 ml. of absolute ethanol and 10 ml. of dioxane, at 50 to 60° C., and 0.3 ml. of concentrated sulfuric acid are added to the stirred and cooled solution. The thus-obtained mixture is poured with stirring into 300 ml. of 20% aqueous sodium sulfate solution, preheated to 50 to 60° C., and the warm liquid phase is decanted before crystalline sodium sulfate (containing crystal water) begins to separate. The residue is treated twice with small quantities of water, and the solids are dried. 2 g. of dark blue, resinous N,N,N',N'-tetra-($\beta$-bromo-ethyl)-thionine hydrogen sulfate are obtained. The elementary analysis corresponds to the values calculated from the btto. formula of $C_{20}H_{23}Cl_4N_3O_4S_2$.

EXAMPLE 13

0.01 mole of analytically pure N,N,N',N'-tetra-($\beta$-chloro-ethyl)-thionine chloride (or the corresponding bromide, hydrogensulfate or perchlorate salt) are dissolved in 100 ml. of ethanol under heating. The solution is cooled and 0.01 mole of potassium hydroxide or sodium hydroxide dissolved in 2 ml. of water are added. The dark blue solution turns greyish-brown during addition. The practically water-insoluble hydroxide of the Formula I is isolated preferably as follows:

The alcoholic solution is evaporated to dryness in vacuo, the residue is triturated with 10 ml. of water, the solids are filtered off and the salts are removed by washing with a small quantity of water. N,N,N',N'-tetra-($\beta$-chloro-ethyl)-thionine hydroxide is obtained with a yield of about 80 to 90 percent.

Crude thionine salts of the Formula I can be used as starting materials as well, but in this case the alcoholic solution has to be filtered before adding the alkaline solution. According to another method, the finely powdered pure thionine salts of the Formula I are treated with alkali hydroxide in aqueous medium.

EXAMPLE 14

The pure N,N,N',N' - tetra - ($\beta$ - chloro-ethyl)-thionine hydroxide prepared according to Example 13 forms salts with organic and mineral acids. The salt formation is preferably carried out in aqueous or alcoholic medium. If the reactants are introduced in equimolar quantities, substantially pure material can be obtained merely by evaporating the solution or suspension. If the formed thionine salt is poorly soluble in water, then the alcoholic solution of N,N,N',N'-tetra-($\beta$-chloro-ethyl)-thionine hydroxide obtained according to Example 13 can be used as starting material, and the inorganic alkaline salts are removed after evaporation e.g. by washing the residue with water. In this way there can be obtained N,N,N',N'-tetra-(β-chloro-ethyl)-thionine chloride, bromide, iodide, sulfate, phosphorates, acetate, benzoate, tartrates, fumarates, maleinates, citrates, etc.

EXAMPLE 15

The poorly water-soluble thionine salts of the Formula I wherein anion Y is derived from a carboxylic acid, can be prepared preferably as follows:

The corresponding thionine chloride, bromide or perchlorate is reacted with the sodium, potassium or ammonium salt of the desired carboxylic acid, preferably in aqueous medium, the solids are collected by filtration, and the inorganic salts are removed by washing the precipitate with water. Following the above procedure, N,N,N',N' - tetra - (β - chloro - ethyl) - thionine acetate, benzoate, tartrates, fumarates, maleinates, citrates, etc. can be obtained.

EXAMPLE 16

According to the procedures described in Examples 1 to 15, there can be prepared thionine derivatives having the Formula I, wherein R and/or $R^1$ represent a methoxy group of chlorine atom.

The following derivatives have been synthetized:

N,N,N',N'-tetra(β-chloro-ethyl)-1-chloro-thionine chloride ($C_{20}H_{21}Cl_6N_3S$)

N,N,N',N'-tetra-(β-chloro-ethyl)-1-chloro-thionine bromide ($C_{20}H_{21}BrCl_5N_3S$)

N,N,N',N'-tetra-(β-chloro-ethyl)-3-chloro-thionine chloride ($C_{20}H_{21}Cl_6N_3S$)

N,N,N',N'-tetra-(β-chloro-ethyl)-3-chloro-thionine bromide ($C_{20}H_{21}BrCl_5N_3S$)

N,N,N',N'-tetra-(β-chloro-ethyl)-3-methoxy-thionine chloride ($C_{21}H_{24}Cl_5N_3OS$)

N,N,N',N'-tetra-(β-chloro-ethyl)-3-methoxy-thionine bromide ($C_{21}H_{24}BrCl_4N_3OS$).

What we claim is:
1. A thionine derivative having the formula

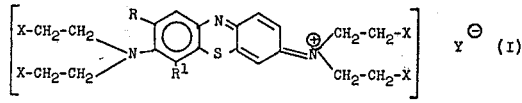

wherein R is H, Cl or methoxy, $R^1$ is H or Cl, X is Cl and Y is Cl, perchlorate, $HSO_4$ tartrate or Br.

References Cited

UNITED STATES PATENTS 2,069,670   2/1937   Hoffman _____ 260—243

HENRY R. JILES, Primary Examiner

H. I. MOATZ, Assistant Examiner

U.S. Cl. X.R.
424—247